(12) United States Patent
Kuditipudi et al.

(10) Patent No.: US 9,917,726 B2
(45) Date of Patent: Mar. 13, 2018

(54) METHOD AND APPARATUS FOR BUNDLING MULTIPLE LOGGER EVENTS

(71) Applicants: Sivaramakrishna Kuditipudi, Bangalore (IN); Nisha Desai, Mountain View, CA (US); Prashanth Ishwar, Mountain View, CA (US); Preeti V Naik, Mountain View, CA (US)

(72) Inventors: Sivaramakrishna Kuditipudi, Bangalore (IN); Nisha Desai, Mountain View, CA (US); Prashanth Ishwar, Mountain View, CA (US); Preeti V Naik, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1385 days.

(21) Appl. No.: 13/853,130

(22) Filed: Mar. 29, 2013

(65) Prior Publication Data

US 2014/0297832 A1    Oct. 2, 2014

(51) Int. Cl.
*G06F 15/173* (2006.01)
*H04L 12/24* (2006.01)

(52) U.S. Cl.
CPC ........ *H04L 41/069* (2013.01); *H04L 41/0627* (2013.01)

(58) Field of Classification Search
CPC ... H04L 29/06; H04L 67/142; H04L 67/1027; H04L 41/0681; H04L 41/145; H04L 41/0213; H04L 41/08; H04L 41/0806; H04L 41/0893; H04L 41/064; H04L 41/0695; H04L 41/147; H04L 63/1416; H04L 12/2834; H04L 12/00; H04L 12/2424; H04L 45/00; H04L 45/28; H04L 45/58; H04L 61/2053; H04L 61/2546; H04L 43/04; G06F 3/0635; G06F 11/0757; G06F 11/076; G06F 11/1471; G06F 11/2025; G06F 2121/2154; G06F 9/48; G06F 9/285; Y02B 60/1228; H04N 21/23106; H04N 21/44227; H04N 21/64732; H04W 28/02; H04W 28/12; H04M 15/00; H04M 15/58

USPC ................ 709/220–224, 227–231, 238–239, 709/248–249

See application file for complete search history.

(56) References Cited

U.S. PATENT DOCUMENTS

| 6,125,392 A * | 9/2000 | Labatte ............... G06F 11/3476 707/999.01 |
| 2003/0204595 A1* | 10/2003 | Lev ......................... H04L 41/06 709/226 |
| 2009/0089414 A1* | 4/2009 | Jaladanki ............ H04L 41/0686 709/224 |

(Continued)

*Primary Examiner* — Joshua Joo
*Assistant Examiner* — Da T Ton
(74) *Attorney, Agent, or Firm* — Tong, Rea, Bentley & Kim, LLC

(57) ABSTRACT

A system, method, apparatus and mechanisms for detecting traps triggered by Label Switch Path (LSP) interface events, determining the corresponding event characteristics, associating the detected traps with a bitmap marker indicative of their respective event characteristics, and bundling together bitmaps having common markers to provide thereby respective bundles of common logger events adapted for bulk transmission to a management system.

20 Claims, 5 Drawing Sheets

(56) References Cited

U.S. PATENT DOCUMENTS

2010/0019947 A1\* 1/2010 Kruys .................... G01S 7/021
                                                              342/20
2014/0280162 A1\* 9/2014 Halpern ............ G06F 17/30386
                                                             707/737

\* cited by examiner

METHOD AND APPARATUS FOR BUNDLING MULTIPLE LOGGER EVENTS

FIELD OF THE INVENTION

The invention relates generally to communication networks and, more specifically, to management of large numbers of Multiprotocol Label Switching (MPLS) traps generated by Service Routers (SR).

BACKGROUND

Multiprotocol Label Switching (MPLS) enables efficient delivery of a wide variety of differentiated, end-to-end services. MPLS supports delivery of such services using label switched paths (LSPs). Depending on different factors, hundreds or even thousands of LSPs may be provisioned in a given MPLS network. As network conditions change, LSPs provisioned in a given MPLS network often need to be changed.

With an MPLS trap function enabled, trap packets associated with various event notifications are generated to report critical MPLS events. Such trap packets (or traps) are sent from the reporting network element (e.g., a switch or router) to a network management systems (NMS) used for managing various aspects of the relevant communication networks. In very large networks MPLS networks, NMSs employed for managing traps generated by Service Routers (SRs) and the like may need to handle an enormous numbers of events may be generated thereby slowing down NMS operations.

SUMMARY

Various deficiencies in the prior art are addressed by embodiments for managing events within communication networks using a trap management capability in which events having a common marker are bundled together and forwarded to a network management system (NMS) via a Service Aware Manager (SAM).

Specifically, various embodiments provide a system, method, apparatus and mechanisms for detecting traps triggered by Label Switch Path (LSP) interface events, determining the corresponding event characteristics, associating the detected traps with a bitmap marker indicative of their respective event characteristics, and bundling together bitmaps having common markers to provide thereby respective bundles of common logger events adapted for bulk transmission to a management system.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
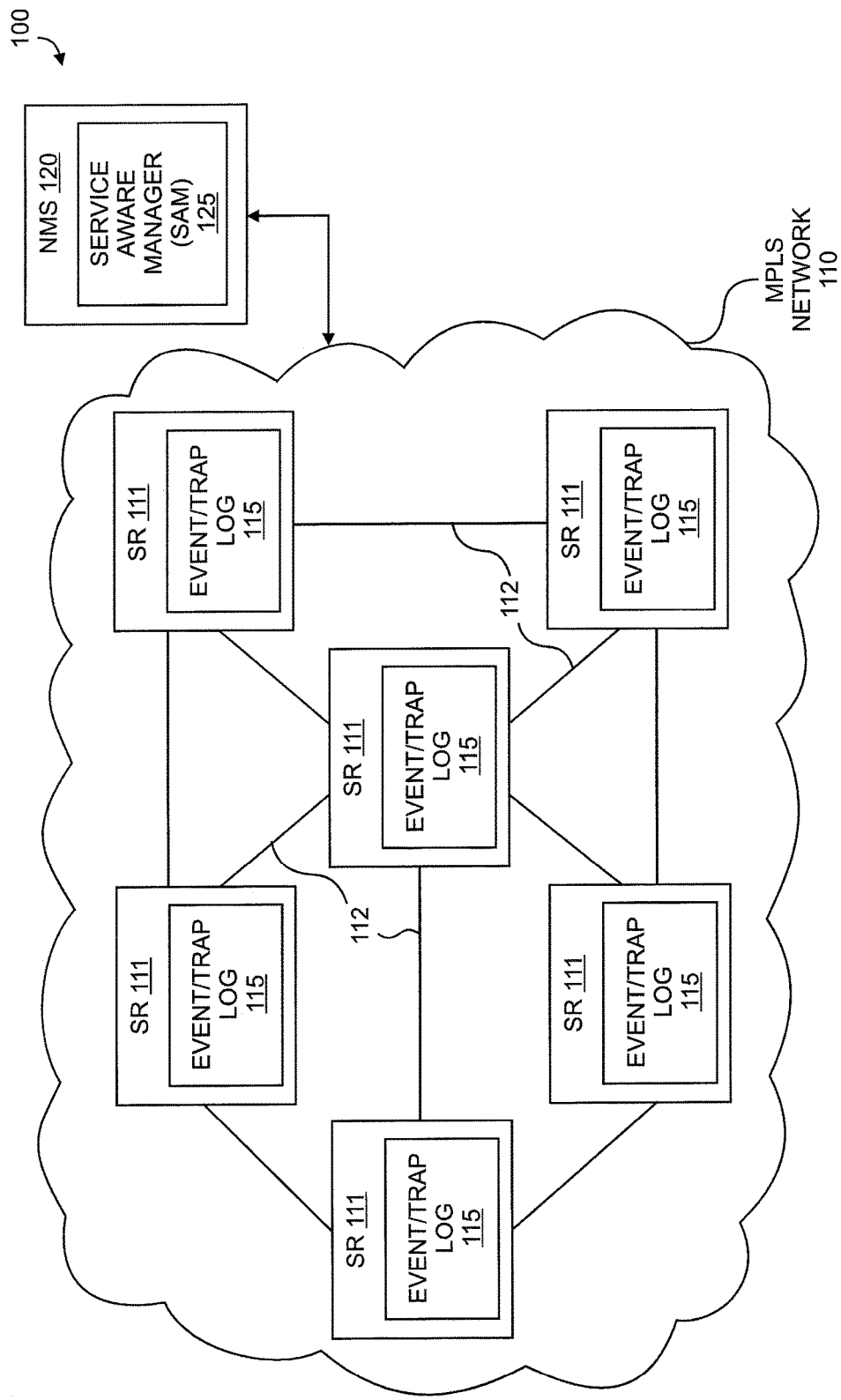
FIG. 1 depicts an exemplary Multiprotocol Label Switching (MPLS) communications network illustrating one embodiment of an event management.

An event management capability is depicted and described herein. The event management capability enables efficient and scalable management of events. Although the event management capability is primarily depicted and described herein within the context of management of Multiprotocol Label Switching (MPLS) communications networks, it will be appreciated that the event management capability may be used for managing events or traps of any other suitable types of communication networks.

Generally speaking, network elements keep a log of various events relevant to their operation, such as the creation or deletion of a path through a router, the occurrence of an error, the number of errors and so on. In addition to logging events locally, network elements typically report event occurrences to management entities by transmitting event status messages to a network management system (NMS) or other entity. Specifically, trap packets associated with various event notifications are generated to report critical MPLS events. Such trap packets (or traps) are sent from the reporting network element (e.g., a switch or router) to the NMS or other entity used for managing various aspects of the relevant communication networks The specific events captured by an event log at a network element varies in accordance with the type and purpose of network element. For at least those network elements in which enormous numbers of specific occurrences occur, the amount of information within the event log can be quite large and, correspondingly, the amount of control plane traffic associated with event status messages is also quite large.

Various embodiments operate to "bundle" events deemed to be similar in some way (e.g., all path creation events, all path deletion events and so on) such that a bundled event including information normally associated with a plurality of event status messages is provided in a single transmission to a NMS or other entity. In this manner, control plane traffic associated with the event status messages and the like is reduced.

As will be described more detail below, for any given network element adapted according to the various embodiments, a plurality of bits (e.g., a bite, word or some other data element) is used to represent the different types or characteristics of event status messages or traps to be bundled for the network element. In a described embodiment, each bit represents a specific event. In other embodiments, specific bit patterns represent specific bits (i.e., a 4-bit word may be used to represent the occurrence of any of 15 different events). For example, in a crossconnect switch example described below, a first bit is used to indicate that a path creation event has occurred, a second bit is used to indicate that a path deletion event has occurred, and a third bid is used to indicate that a persistent condition has occurred or is being maintained.

Thus, in various embodiments, each of the event status messages or traps are "tagged" with a bit pattern indicative of the characteristic of the event status message or trap. Those event status messages having a common bit pattern (i.e., a common characteristics such as the illustrative create, delete or persist characteristics) are bundled together and periodically forwarded as a group or bundle to a NMS or other entity.

FIG. 1 depicts an exemplary Multiprotocol Label Switching (MPLS) communications network illustrating one embodiment of an event management. As depicted in FIG. 1, an exemplary MPLS communication system 100 includes a MPLS network 110 and a network management system (NMS) 120. Multiprotocol Label Switching (MPLS) is a mechanism in high-performance telecommunications networks that directs data from one network node to the next based on short path labels rather than long network addresses, avoiding complex lookups in a routing table. The labels identify virtual links (paths) between distant nodes rather than endpoints. MPLS can encapsulate packets of various network protocols. MPLS supports a range of access technologies, including T1/E1, ATM, Frame Relay, and DSL.

MPLS is a highly scalable, protocol agnostic, data-carrying mechanism. In an MPLS network, data packets are assigned labels. Packet-forwarding decisions are made solely on the contents of this label, without the need to examine the packet itself. This allows one to create end-to-end circuits across any type of transport medium, using any protocol. The primary benefit is to eliminate dependence on a particular OSI model data link layer technology, such as Asynchronous Transfer Mode (ATM), Frame Relay, Synchronous Optical Networking (SONET) or Ethernet, and eliminate the need for multiple layer-2 networks to satisfy different types of traffic. MPLS belongs to the family of packet-switched networks.

MPLS operates at a layer that is generally considered to lie between traditional definitions of layer 2 (data link layer) and layer 3 (network layer), and thus is often referred to as a "layer 2.5" protocol. It was designed to provide a unified data-carrying service for both circuit-based clients and packet-switching clients which provide a datagram service model. It can be used to carry many different kinds of traffic, including IP packets, as well as native ATM, SONET, and Ethernet frames.

The MPLS network 110 may be monitored by any of a plurality of network elements, each of which generates event status messages. Within the context of the MPLS network 110, such event status messages may comprise, illustratively, Link Up, Link Down, LSP Up, LSP Down, LSP Primary, LSP Reroute and so on. Generally speaking, any network monitoring device may provide event status messages associated with anything of interest to the network operator or service provider(s). Moreover, more, fewer and/or different event status messages may be used within the context of the MPLS network 110. Further, the various techniques and mechanisms described herein with respect to the MPLS network 110 are equally applicable to other types of networks, other types of network elements and, broadly speaking, any type of entity generating event status messages.

MPLS network 110 includes a plurality of network elements (NEs) 111 (collectively, NEs 111) in communication via a plurality of communication paths (CPs) 112 (collectively, CPs 112), which support traffic within MPLS network 110. For example, as depicted in FIG. 1, the NEs 111 include switches and service routers (SRs) (e.g., Source, Destination, PLR and Transit routers). NEs 111 are configured to intelligently generate traps for at least a portion of the detected events, and to intelligently enable the generated traps to be available to NMS 120 using various functions of the event management capability, thereby enabling the NMS 120 to maintain a current view of the state of the MPLS network 110. For example, the cable & wireless network has a large number of label-switched paths (LSPs) (e.g., 4000) coupled to a plurality of SR routers interfacing the network. When one of the physical port between these routers is down, all the LSPs are rerouted and as a result a large number of traps will be generated by all SR routers (Source, Destination, PLR and Transit routers).

NMS 120 provides various management functions for MPLS network 110. NMS 120 is configured to receive traps generated by NEs 111, and to process the received traps for providing various management functions typically performed by management systems. NMS 120 is configured to support various functions of the event management capability, thereby enabling NMS 120 to maintain a current view of the state of MPLS network 110. As a result, MPLS network 110 is managed in a more efficient and scalable manner than is possible for existing management systems. Although primarily depicted and described with respect to management functions related to MPLS network events/traps logging, it will be appreciated that NMS 120 may be configured to perform any other network management functions for MPLS network 110.

In one embodiment, the event management capability is provided by enhancing current NE behavior (illustratively, NEs 111) and coupling the enhancements to the NMS (illustratively, SAM 125). The service aware manager (SAM) 125 is configured for providing to NMS 120 various event management functions depicted and described herein (e.g., receiving events/traps logged in event logs 115 of NEs 111, and the like, processing events/traps for providing various management functions, and the like, as well as various combinations thereof).

In this embodiment, the enhancement to NE behavior includes trap capture and trap bundling. This is depicted in FIG. 1 as a plurality of NE event logs 115 implemented on the plurality of NEs 111, respectively, and as an event management module 125 implemented on NMS 120. The event/trap logs 115 are configured for storing events/traps generated by NEs 111 respectively.

In one embodiment, NE 111 supports generation of specific events/traps. In such embodiment, NE 111 generates traps in response to detecting events associated with a session.

In various embodiments, events/traps generated by NEs 111 are made available to NMS 120 (illustratively, SAM 125) by writing or storing the generated events/traps into a plurality of event logs (bitmaps) 115 maintained by the plurality of NEs 111, respectively. The writing of captured traps into event logs 115 may be performed in any suitable manner (e.g., using any suitable format, using any suitable information, and the like). The use of such a local logging embodiment reduces not only such trap as 'vRtrMplsX-CTable,' but also reduces other generic traps sent by Source LSR as well.

In various embodiments, traps generated by NEs 111 are made available to NMS 120 by configuring NEs 111 to cache the traps as the traps are generated by the NEs. In one embodiment, the traps may be provided from NEs 111 to the NMS 120 in any suitable manner, e.g., via an extended event interface (e.g., SNMP traps, Netflow, Syslog, and the like), via a streamed interface (e.g., using, Java Message Service (JMS)/Extensible Markup Language (XML) or any other suitable streamed interface), and the like, as well as various combinations thereof. In one such embodiment, in which the traps are provided to NMS 120, message bundling may be employed for reducing overhead in propagation of traps to NMS 120.

In various embodiments, the traps may be generated in any suitable format, e.g., in an NMS-readable format, which may depend on the manner in which the traps are generated and logged by the NEs 111. In other words, the generated traps may be specified by the NEs 111, and provided to NMS 120, using any suitable machine-readable format(s), thereby enabling efficient processing of the logged traps.

In one embodiment, generated traps are time stamped. In one such embodiment, generated traps are time stamped locally by NEs 111. In this embodiment, time stamping may be performed using any time source suitable for providing reliable time stamps for the generated traps (e.g., Network Time Protocol (NTP), syncE, Building Integrated Timing Supply (BITS), and the like). The use of time stamping in this manner greatly facilitates reconciliation during management processing performed by NMS 120.

In various embodiments, event numbering may be used for simplifying management of event/trap logs or bitmaps 115 and associated use of event/trap logs 115 by NMS 120 for performing management functions. This feature may be provided in place of or in addition to use of time stamping. In one embodiment, generated traps include information configured for use by the NMS 120 (illustratively, SAM 125) in deriving network topology. For example, generated traps may include event type indicators (e.g., create, delete, persistent and the like), logically associated connectivity information (e.g., inbound interfaces, outbound interfaces, and the like), as well as various combinations thereof.

As described herein, trap logs 115 of NEs 111 store traps generated by each NE 111, respectively. Thus, the event/trap logs 115 may be considered to include any information which may be included as part of or otherwise associated with events/traps maintained by a particular NE 111. The traps may be organized within trap logs 115 of NEs 111 in any suitable manner (e.g., using XML format or any other suitable format, using file format, using streaming, and the like).

Although primarily depicted and described herein with respect to embodiments in which the event management capability is supported by each network element of the communication network, it will be appreciated that in other embodiments the event management capability may be supported by only a subset of the network elements of the communication network.

Although primarily depicted and described hereinabove with respect to embodiments in which the event management capability is provided by using a combination of event capture and event bundling, it will be appreciated that in other embodiments only the event capture feature may be used or only the event bundling feature may be used.

Figure 2:
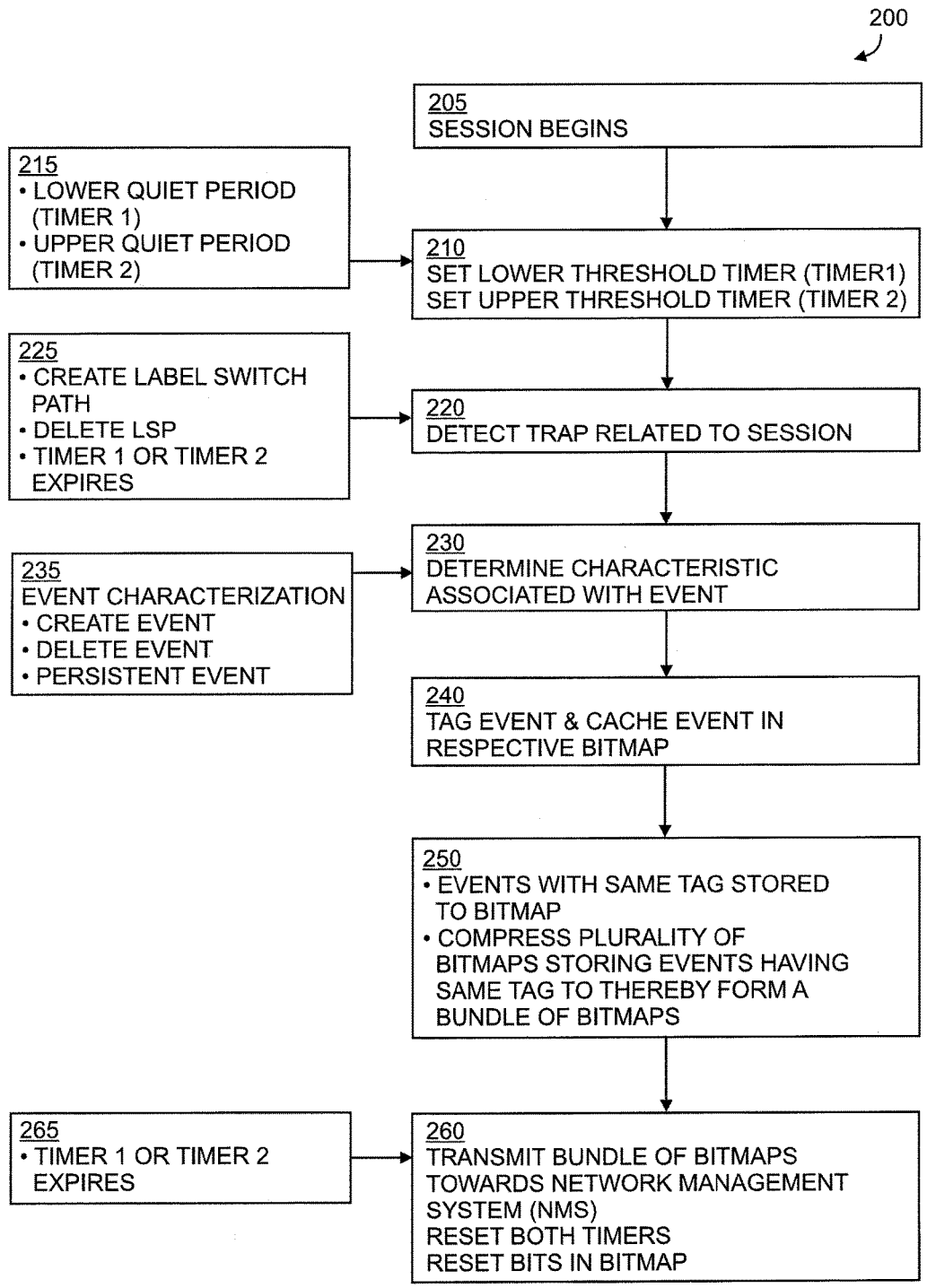
FIG. 2 depicts a flow of a method for bundling of logger events for multiple sessions at a network element of a communication network.

FIG. 2 depicts a flow of a method for bundling of logger events for multiple sessions at a network element of a communication network. The operation of method 200 of FIG. 2 may be better understood by way of reference to the description of the communications network provided in conjunction with FIG. 1.

At step 205, method 200 begins with, illustratively, the initiation of a new session.

At step 210, two timers are initialized to two distinct time intervals, though more than two intervals may be used in various other embodiments. Referring to box 215, the first and second time intervals may comprise a lower (i.e., shorter) time interval denoted as a lower quiet period, and an upper (i.e., longer) time interval denoted as a upper quiet period.

A timer (e.g., timer1) is set to a lower threshold value corresponding to a lower quiet period. In one embodiment, the lower threshold timer is set to 2 minutes as a default value. In another embodiment, other values are used. Another timer (e.g., timer2) is set to the upper threshold value corresponding to an upper quiet period. In one embodiment, the upper threshold timer is set to 10 minutes as a maximum value. In another embodiment, other values are used. At step 220, a trap related to the current session is detected. Referring to box 225, a trap is triggered when a 'create' or 'delete' LSP event is generated. A flag denoted 'deleteOrCreate' indicates if a 'create' or 'delete' event triggered the trap. Another variable 'startIndex' indicates a session index for which a 'create' or 'delete' event is being sent. As such, bit 0 in byte 'SessionIndicesBitMap[0]' indicates session index 1; bit 1 indicates session index 2 and so on. 'SessionIndicesBitMap' denotes the bitmap structure with bits corresponding to all sessions. Flag 'numberOfBitsSet' indicates the number of bits set in 'SessionIndicesBitMap', such that service aware manager (SAM) only reads 'numberOfBitsSet' bits from 'SessionIndicesBitMap' in order to synchronize those many entries.

At step 230, a characteristic associated with the event is determined based on whether an Label Switch Path (LSP) is created or deleted by a service router. Referring to box 235, there are three event types; namely, create, delete and persistent. The object 'persistent' indicates that the NMS is aware of the LSP because either a trap was sent earlier or snmpwalk/get/getNext was executed on the object or the event. The state of 'persistent' is temporarily kept during, illustratively, the duration of timer1.

At step 240, the event is associated with or otherwise tagged with a marker as discussed herein. The marker is cached in its respective bitmap.

At step 250, the plurality of bit maps storing the markers are compressed to thereby form a bundle of bitmaps.

At step 260, upon expiration of timer 1 or timer 2 (box 265), the bundle of bitmaps is transmitted towards the service aware manager (SAM) in NMS 120. In one embodiment, when timer 1 expires, trap 'vRtrMplsSessionsModified' is sent and bits in 'SessionIndicesBitMap' are reset. if timer1 has not expired and some other bit is being set, timer1 is reset. As such, timer1 would keep getting reset (start counting down from 2 minutes). However, the upper threshold timer, which is designated as timer2 is set to 10 minutes. Upper threshold timer, i.e., timer2 is reset every time a logger event is sent. if timer2 expires and no logger event has been sent, trap 'vRtrMplsSessionsModified(T)' is sent and bits in 'SessionIndicesBitMap' are reset. Both timer1 and timer2 are reset. In other embodiments, other variables are reset.

Thus, various embodiments provide a method for trap management at a network element of a communication network operative for detecting traps triggered associated with Label Switch Path (LSP) interface events, determining an event characteristic for each detected trap, associating each detected trap with a marker indicative of the respective determined event characteristic, the marker being cached via a respective bitmap, and compressing bitmaps associated with common markers to thereby form bundles of common logger events.

The bundles of common logger events may be periodically transmitted to a network management system (NMS). Each logger event bundle may be transmitted according to a individual or respective periodic transmission schedule (or parameters/conditions driving that schedule). Multiple logger event bundles may be transmitted at the same time.

In various embodiments, different logger event bundles are transmitted toward a NMS at different times. That is, various embodiments stagger logger event bundle transmission to thereby reduce control plane traffic and resource utilization levels. In various embodiments, the event characteristic comprises any of a Create characteristic, Delete characteristic and Persistent characteristic. In various embodiments, each marker is indicated by a predefined bit value in its bitmap. In various embodiments, the predetermined condition adapted to trigger transmission of one or more logger event bundles may comprise expiration of a predefined time interval, the entering of a time interval between an earlier and later time interval (such as with a transmission decision made at that time).

Figure 3:
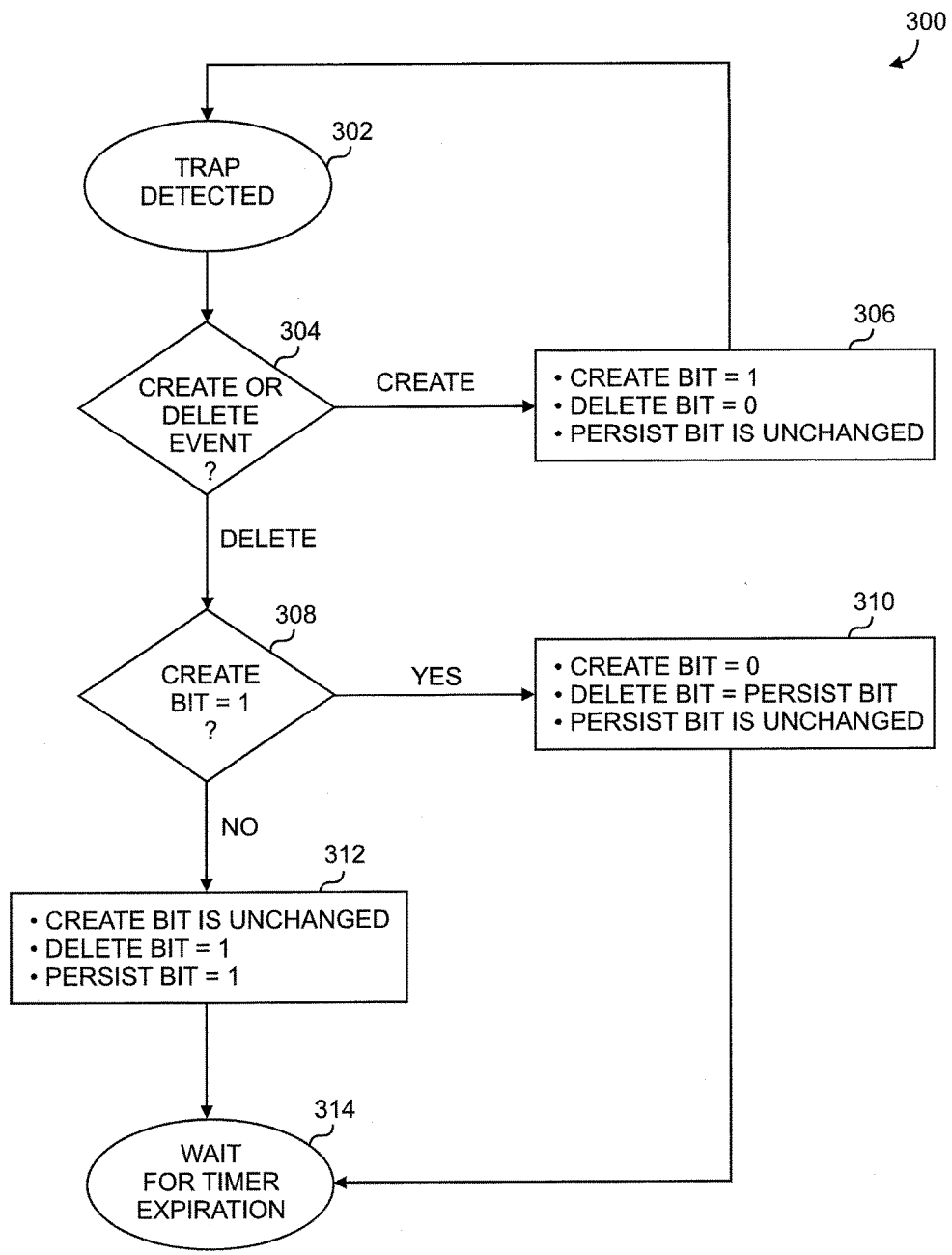
FIG. 3 depicts one embodiment of a method for trap management at a network element of a communication network.

FIG. 3 depicts one embodiment of a method for trap management at a network element of a communication network. The operation of method 300 of FIG. 3 may be better understood by way of reference to the description of the method for event bundling provided in conjunction with FIG. 2.

Various embodiments are directed toward reduction of logger events in a network element. In one embodiment, an algorithm for Xc (cross-connect) logger event is disclosed. The Xc logger event is created or deleted whenever a new rsvp LSP (Label Switch Patch) is created or deleted. The Xc logger event process utilizes a plurality of variables and patterns registered as bits in the execution of the process. For example, with respect to variables some or all of the following variables may used in the context of reduction of logger events embodiment; namely, (1) deleteOrCreate indicates if the logger event is for create or delete; (2) XCIndicesBitMap indicates all XC indexes for which create or delete is being sent; (3) numberOfBitsSet indicates the number of bits set in XCIndicesBitMap such that the NMS will only have to read 'numberOfBitsSet' bits from 'XCIndicesBitMap' to synchronize these many entries; (4) startIndex indicates XC index bit 0; and (5) endIndex indicates the last bit of XCIndicesBitMap. Although these variables are primarily described herein within the context of the Xc logger event, it will be appreciated that other variables may be used to accomplish the same objective.

As for the bits used to designate different events, all are initialized to zero including the C-bit for Create, D-bit for Delete and P-bit for Persist. There are two instances when the bits are toggled: (1) when an LSP is created, C is set to 1, D is set to 0 and P remains unchanged; and (2) when an LSP is deleted, if C=1 then C is set to 0, D takes on the value of P (D=P); if however, C=0 then D is set to 1 and P is also set to 1.

At step 302, the network element detects a trap related to a current session. An Xc logger event is created or deleted whenever a new rsvp LSP (Label Switch Patch) is created or deleted.

At step 304, the network element determines if the trap is a create trap. In this embodiment, two traps can be detected namely, create designated as 'vRtrMplsXCCreate' or delete 'vRtrMplsXCDelete.'

In this embodiment, a flag 'deleteOrCreate' indicates if the trap is for create or delete. Another flag 'startIndex' indicates a session index for which a create or delete trap is being sent. Thus, bit 0 in byte 'SessionIndicesBitMap[0]' indicates session index 1, bit 1 indicates session index 2 and so on. 'SessionIndicesBitMap' denotes the bitmap structure with bits corresponding to all sessions. Flag 'numberOfBitsSet' indicates the number of bits set in 'SessionIndicesBitMap', such that service aware manager (SAM) only reads 'numberOfBitsSet' bits from 'SessionIndicesBitMap' and sync those many entries. In other embodiments, any other suitable manner to perform the above functions may be implemented.

If the inquiry is affirmative, step 306 is executed. If the inquiry is negative then step 308 is executed.

At step 306, C=1(Create bit is set to 1), D=0 (Delete bit is set to zero) and the Persist bit remains unchanged.

At step 308, the network element determines if C=1 (Create bit is set to 1). If the inquiry is affirmative, step 310 is executed. If the inquiry is negative then step 312 is executed.

At step 310, C=0 (Create bit is set to 0), D=P (Delete takes on the value of P) and the Persist bit remains unchanged.

At step 312, Create bit (C bit remains unchanged), D=1 (Delete bit is set to one), P=1 (Persist bit is set to 1). At step 314, the method waits for the expiration of a timer.

Upon expiration of a timer, a logger event bit map is sent under the following conditions: (1) known to NMS; (2) not known to NMS; (3) Create logger event; and (4) Delete logger event.

In the first case, NMS is aware of this entity because the logger event was earlier transmitted (regardless of whether or not logger event reached NMS) or because an entity (e.g., NMS/CLI/misc) executed a function (e.g., snmpwalk/get/getNext) on the object or a resync was done on the node. There is a quiet period (default 2 minutes) during which this state is temporarily tracked. The quiet period is a time period during which no changes (creates/deletes) occur on the object. At the end of the quiet period, a decision is made to send create/delete logger event to NMS. If any create/delete events are detected for any session index in the bitmap and no further create/delete events occur for 2 minutes then a logger event is sent. Alternatively, a waiting period/interval is observed before transmitting a logger event to NMS. In one embodiment, a waiting window of 10 minutes is observed. In other embodiments, different waiting periods are implemented.

In the second case, a new event logger is also sent when NMS is unaware of the entity's existence.

In the third case, when an LSP is created (Create logger event). If the object (mpls XC) is 'known' to NMS and gets deleted/recreated and remains created at the end of the quiet period, a logger event is sent. If the object (mpls XC) is 'not known' to NMS and remains created at the end of the quiet period, a logger event is sent.

Lastly, when an LSP is deleted (Delete logger event). If the object (mpls XC) is 'known' to NMS and remains deleted at the end of the quiet period, a logger event is sent. If the object (mpls XC) is 'not known' to NMS and is deleted by the end of the quiet period, a logger event is not sent.

Figure 4:
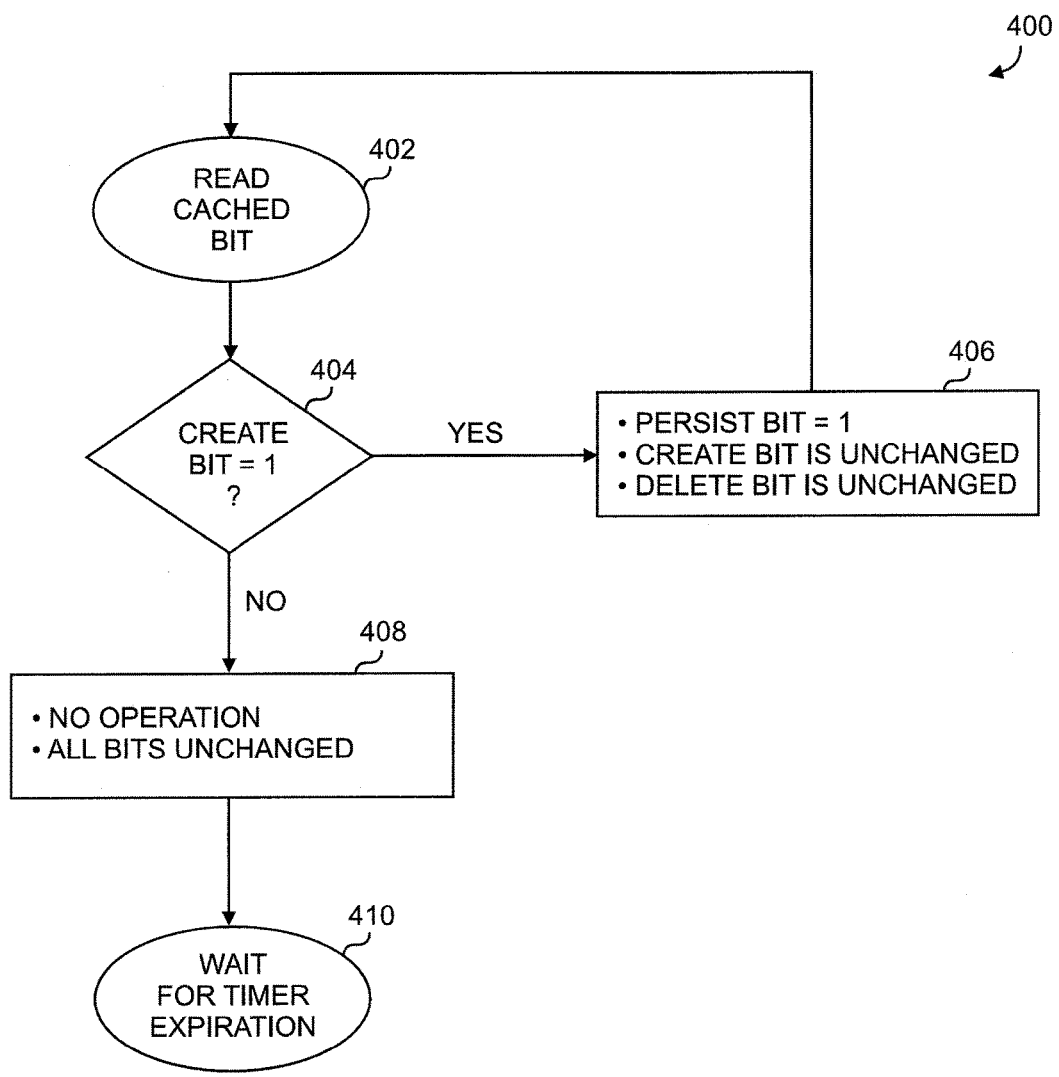
FIG. 4 depicts one embodiment of a method for trap management at a network element of a communication network.

FIG. 4 depicts one embodiment of a method for trap management at a network element of a communication network. The operation of method 400 of FIG. 4 may be better understood by way of reference to the description of the bundling feature provided in conjunction with FIG. 2.

At step 402, snmp reads a cached bit and a corresponding bit in the bit map is set to C.

At step 404, the network node determines if C=1 (Create bit is set). If the inquiry is affirmative, step 406 is executed. If the inquiry is negative, step 408 is executed.

At step 406, Create bit (C bit remains unchanged), Delete bit (D bit remains unchanged), P=1 (Persist bit is set to 1).

At step 408, no operation is performed. All bits remain unchanged.

At step 410, the method waits for the expiration of a timer. Upon expiration of the timer, the logger event bitmap is transmitted towards SAM (service aware manager).

Although depicted and described as ending, it will be appreciated that various other actions may be taken, such as initiation of one or more management functions in response to receiving and/or based on the trap/event, and the like, as well as various combinations thereof.

Although the event management capability is primarily depicted and described herein within the context of management of traps/events, it will be appreciated that the event management capability may be used for managing events of any other suitable types in any other suitable types of communication networks. For example, in additional to protocols such as PIM, IGMP, DVMRP, and the like, the event management capability may be used for managing events of such various link layer network protocols (e.g., Spanning Tree Protocol (STP), Rapid STP (RSTP), Multiple STP (MSTP), Multiple Registration Protocol (MRP), Multiple Virtual Local Area Network (VLAN) Registration Protocol (MVRP), Multiple Media Access Control (MAC) Registration Protocol (MMRP), and the like), various Multiprotocol Label Switching (MPLS) related protocols (e.g., Resource Reservation Protocol-Traffic Engineering (RSVP-TE) and the like), and the like.

Furthermore, and more generally, the event management capability described herein may be used for managing events for any node-local protocols having local network element state but not global network state, as well as any other types of protocols which may benefit from various functions of the event management capability depicted and described herein and/or any other types of events, which may utilize various functions of the event management capability depicted and described herein.

Figure 5:
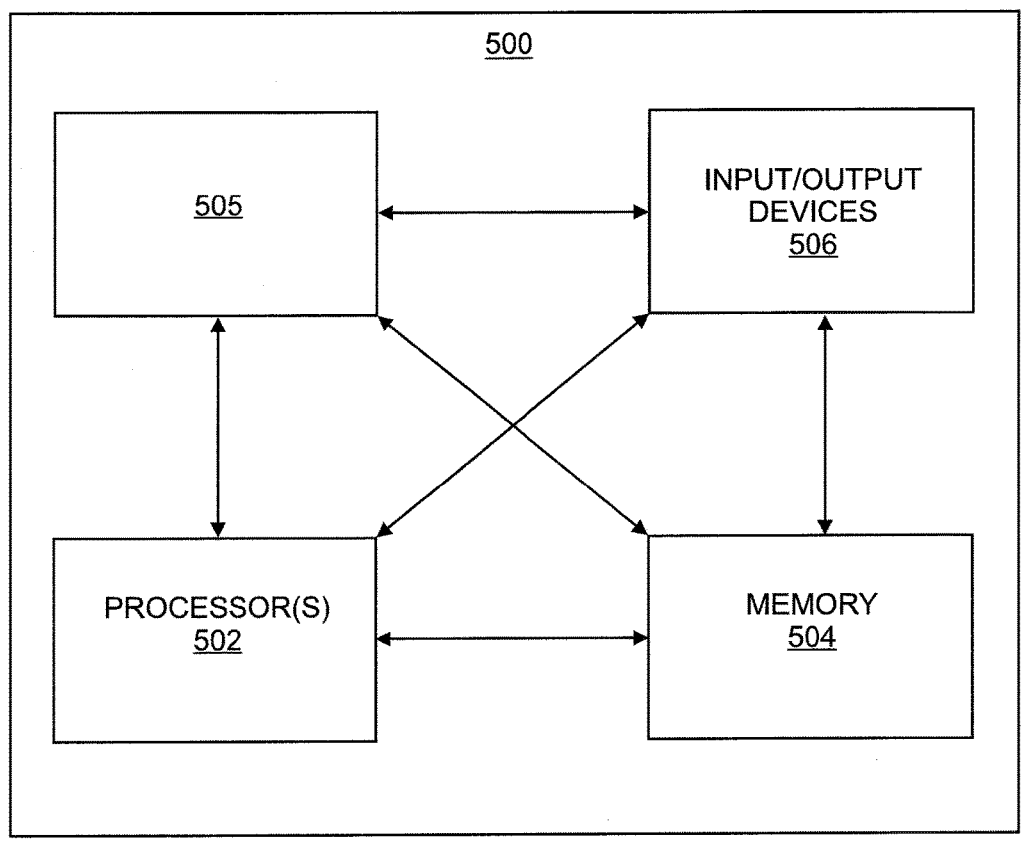
FIG. 5 depicts a high-level block diagram of a computing device suitable for use in performing the functions described herein.

FIG. 5 depicts a high-level block diagram of a computing device, such as a processor in a telecom network element, suitable for use in performing the functions described herein, such as the various network management functions, LSR functions, routing/path functions and so on associated with the various elements described above with respect to the figures.

As depicted in FIG. 5, computing device 500 includes a processor element 503 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in a combination of software and hardware, e.g., using a general purpose computer, one or more application specific integrated circuits (ASIC), and/or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory of a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for trap management at a network element of a communication network, comprising:
   detecting traps triggered associated with Label Switch Path (LSP) interface events;
   determining an event characteristic for each detected trap;
   associating each detected trap with a marker indicative of the respective determined event characteristic, said marker being cached via a respective bitmap including a set of bits associated with a respective set of LSPs of the network element, the bits being set in manner indicative as to ones of the LSPs having respective ones of the detected traps associated therewith;
   compressing bitmaps associated with common markers to thereby form bundles of common logger events; and
   periodically transmitting said bundles of common logger events toward a network management system (NMS).

2. The method of claim 1, wherein said event characteristic for each detected trap comprises any of a Create characteristic, Delete characteristic and Persistent characteristic.

3. The method of claim 1, wherein each marker is indicated by a predefined bit value in said respective bitmap.

4. The method of claim 1, wherein said bundles of common logger events are transmitted toward said NMS in response to the occurrence of a predetermined condition.

5. The method of claim 4, wherein said predetermined condition comprises any of a Create logger event, a Delete logger event and a quiet period.

6. The method of claim 4, wherein said predetermined condition comprises an expiration of a predefined time interval.

7. The method of claim 6, wherein said predefined time interval comprises a lower quiet period and an upper quiet period, said lower quiet period comprises a default value and the upper quiet period comprises a maximum value, said maximum value being greater than said default value.

8. The method of claim 7, further comprising determining whether to transmit said bundles of common logger events upon expiration of said lower quiet period or upon expiration of said upper quiet period.

9. The method of claim 1, wherein said step of detecting traps comprises detecting traps associated with specific sessions.

10. The method of claim 6, wherein said predefined time interval is reset upon transmitting said bundles of common logger events.

11. The method of claim 1, wherein different logger event bundles are transmitted toward said NMS at different times.

12. The method of claim 1, wherein, for one of the respective bitmap, a common logger event bundle has associated therewith a value indicative of a quantity of bits in the set of bits.

13. The method of claim 1, wherein, for one of the respective bitmap, a common logger event bundle has associated therewith a first value indicative of a starting index associated with a first bit in the set of bits and a second value indicative of a last index associated with a last bit in the set of bits.

14. A telecom network elenient, comprising:
a processor and a memory communicatively connected to the processor, the processor configured for:
detecting traps triggered associated with Label Switch Path (LSP) interface events;
determining an event characteristic for each detected trap;
associating each detected trap with a marker indicative of the respective determined event characteristic, said marker being cached via a respective bitmap including a set of bits associated with a respective set of LSPs of the telecom network element, the bits being set in a manner indicative as to ones of the LSPs having respective ones of the detected traps associated therewith:
compressing bitmaps associated with common markers to thereby form bundles of common logger events; and
periodically transmitting said bundles of common logger events toward a network management system (NMS).

15. The telecom network element of claim 14, wherein, for one of the respective bitmap, a common logger event bundle has associated therewith a value indicative of a quantity of bits in the set of bits.

16. The telecom network element of claim 14, wherein, for one of the respective bitmap, a common logger event bundle has associated therewith a first value indicative of a starting index associated with a first bit in the set of bits and a second value indicative of a last index associated with a last bit in the set of bits.

17. A non-transitory computer-readable storage medium storing instructions which, when executed by a processor within a telecom network element, configure operation of the telecom network element to perform a method for trap management at a network element of a communication network, the method comprising:
detecting traps triggered associated with Label Switch Path (LSP) interface events;
determining an event characteristic for each detected trap;
associating each detected trap with a marker indicative of the respective determined event characteristic, said marker being cached via a respective bitmap including a set of bits associated with a respective set of LSPs of the telecom network element, the bits being set in a manner indicative as to ones of the LSPs having respective ones of the detected traps associated therewith;
compressing bitmaps associated with common markers to thereby form bundles of common logger events; and
periodically transmitting said bundles of common logger events toward a network management system (NMS).

18. The non-transitory computer-readable storage medium of claim 17, wherein, for one of the respective bitmap, a common logger event bundle has associated therewith a value indicative of a quantity of bits in the set of bits.

19. The non-transitory computer-readable storage medium of claim 17, wherein, for one of the respective bitmap, a common logger event bundle has associated therewith a first value indicative of a starting index associated with a first bit in the set of bits and a second value indicative of a last index associated with a last bit in the set of bits.

20. A computer program product comprising a non-transitory computer-readable storage medium storing computer instructions which, when executed by a processor in a telecom network element, configure operation of the telecom network element to provide a method for trap management at a network element of a communication network, the method comprising:
detecting traps triggered associated with Label Switch Path (LSP) interface events;
determining an event characteristic for each detected trap;
associating each detected trap with a marker indicative of the respective determined event characteristic, said marker being cached via a respective bitmap including a set of bits associated with a respective set of LSPs of the telecom network element, the bits being set in a manner indicative as to ones of the LSPs having respective ones of the detected traps associated therewith;
compressing bitmaps associated with common markers to thereby form bundles of common logger events; and
periodically transmitting said bundles of common logger events toward a network management system (NMS).

* * * * *